United States Patent [19]

Dunmire

[11] Patent Number: 5,107,888
[45] Date of Patent: Apr. 28, 1992

[54] N-SHAPED BACKFLOW PREVENTOR

[75] Inventor: Charles W. Dunmire, Fresno, Calif.

[73] Assignee: CMB Industries, Inc., Fresno, Calif.

[21] Appl. No.: 650,799

[22] Filed: Feb. 5, 1991

Related U.S. Application Data

[63] Continuation-in-part of Ser. No. 435,870, Nov. 13, 1989, Pat. No. 4,989,635.

[51] Int. Cl.$^5$ ............................................. F16K 15/03
[52] U.S. Cl. ................................. 137/527; 137/512; 137/614.2; 251/337
[58] Field of Search .................. 137/512, 512.3, 527, 137/527.2, 527.4, 614, 614.2; 251/303, 337

[56] References Cited

U.S. PATENT DOCUMENTS

| | | | |
|---|---|---|---|
| 213,394 | 3/1879 | Cornwall | 137/512 |
| 510,503 | 12/1893 | Falkinburg | 137/527 |
| 751,210 | 2/1904 | Smith | 137/512 X |
| 825,499 | 7/1906 | Sturtevant | 137/527 |
| 980,188 | 1/1911 | Blauvelt | 137/527 |
| 1,399,791 | 12/1921 | Pierson | 137/527 |
| 1,871,536 | 8/1932 | Le Bus | 137/527 |
| 2,064,247 | 12/1936 | Evans | 137/527 |
| 2,224,290 | 12/1940 | Corbin | 137/613 X |
| 2,389,413 | 11/1945 | Carlton | 137/613 X |
| 2,515,425 | 7/1950 | Restemeier | 137/527 |
| 2,556,277 | 6/1951 | Hill et al. | 137/527 |
| 2,586,942 | 2/1952 | Grove | 137/512 X |
| 2,827,921 | 3/1958 | Sherman | 251/303 |
| 3,026,902 | 3/1962 | Ruhl, Jr. | 137/527 |
| 3,051,151 | 8/1962 | Helwig | 137/512 X |
| 3,789,874 | 2/1974 | Hills | 137/527 |
| 3,990,471 | 11/1976 | Schutzer et al. | 137/527 |
| 4,067,356 | 1/1978 | Kreuz | 137/527 |
| 4,109,819 | 8/1978 | Kushman et al. | 137/527 |
| 4,276,905 | 7/1981 | Lourdeaux | 137/613 X |
| 4,284,097 | 8/1981 | Becker et al. | 137/512 X |
| 4,333,495 | 6/1982 | Griswold et al. | 137/512 X |
| 4,457,333 | 7/1984 | Sharp | 137/527 |
| 4,552,174 | 11/1985 | Carl et al. | 251/337 |
| 4,595,032 | 6/1986 | Banks | 137/527 |
| 4,802,507 | 2/1989 | Willson | 137/613 |
| 4,991,622 | 2/1991 | Brewer et al. | 137/512 |

FOREIGN PATENT DOCUMENTS 3330409 3/1985 Fed. Rep. of Germany ...... 137/512

OTHER PUBLICATIONS

"Backflow Prevention Assemblies", a brochure of FEBCO, pp. 1, 8–16 and 21, date unknown.
"Installation, Maintenance and Parts manual for Backflow Prevention Assemblies", Ames Co., pp. 7–8, 12, date unknown.
"Model RP-1 Backflow Preventor", Clayton Automatic Valves, pp. 88–89, date unknown.
"Installation/Operation/Maintenance" Manual, Clayton Automatic Valves, pp. 63–79, date unknown.

*Primary Examiner*—John Rivell
*Attorney, Agent, or Firm*—Townsend and Townsend

[57] ABSTRACT

A backflow preventor with increased performance, and increased ease of installation is provided. The check valves are configured to assist in redirecting flow along the desired pathway, when they are in the open position. The pathway is designed so that the number of changes of flow direction of the average streamline flow is reduced, preferably being about 180°. The check valves are configured to reduce or eliminate divergent flow around the edges of the valve disks. A check valve with a reduced hold-open pressure includes a biasing device, such as a spring, directly connected to a pivoting clapper at one end and to the valve body at the other end. No intervening pivoting links are used between the spring and the clapper. Preferably, the clapper is connected only by being pivoted to the valve body and by the spring connecting it to the valve body.

14 Claims, 10 Drawing Sheets

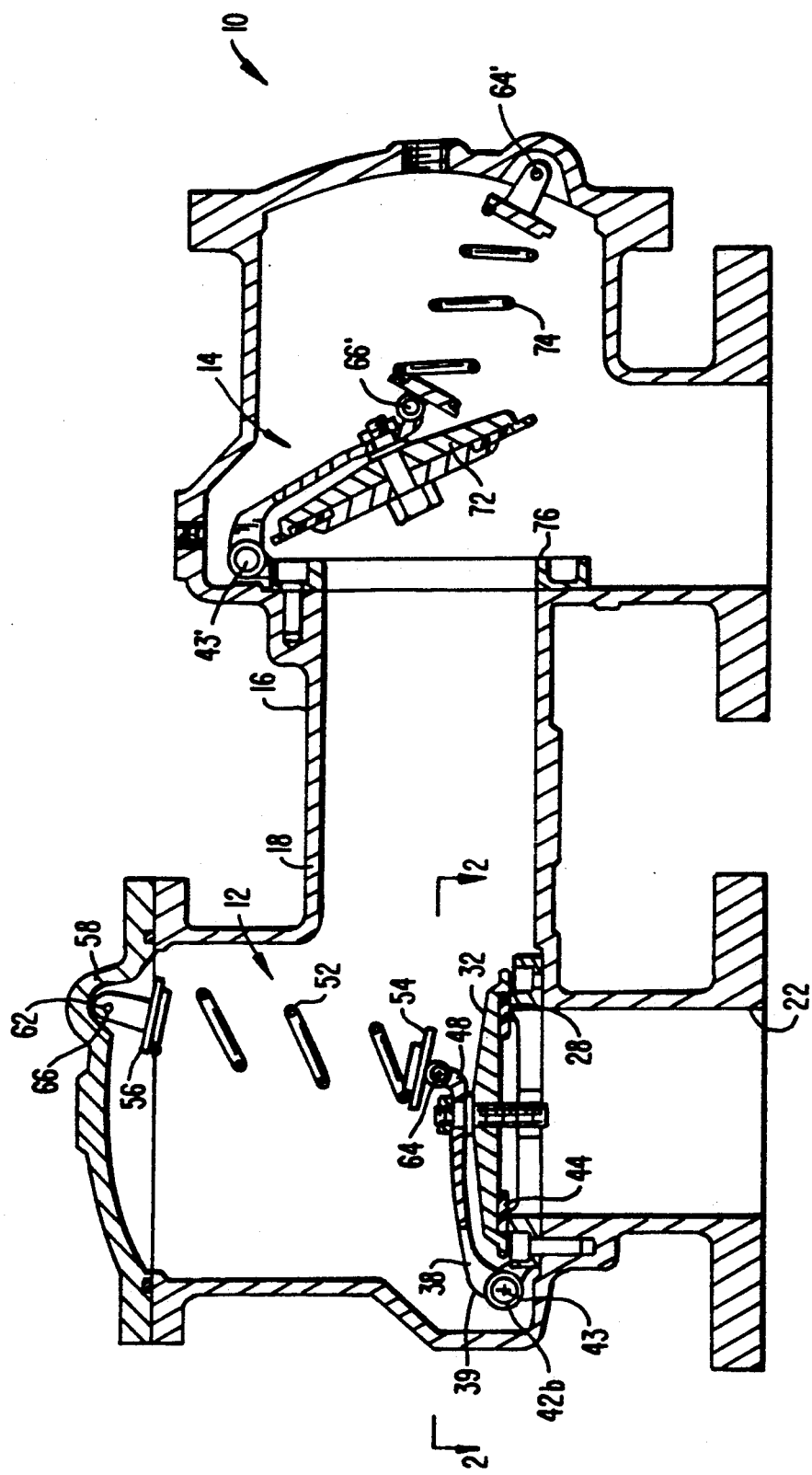
FIG._1.

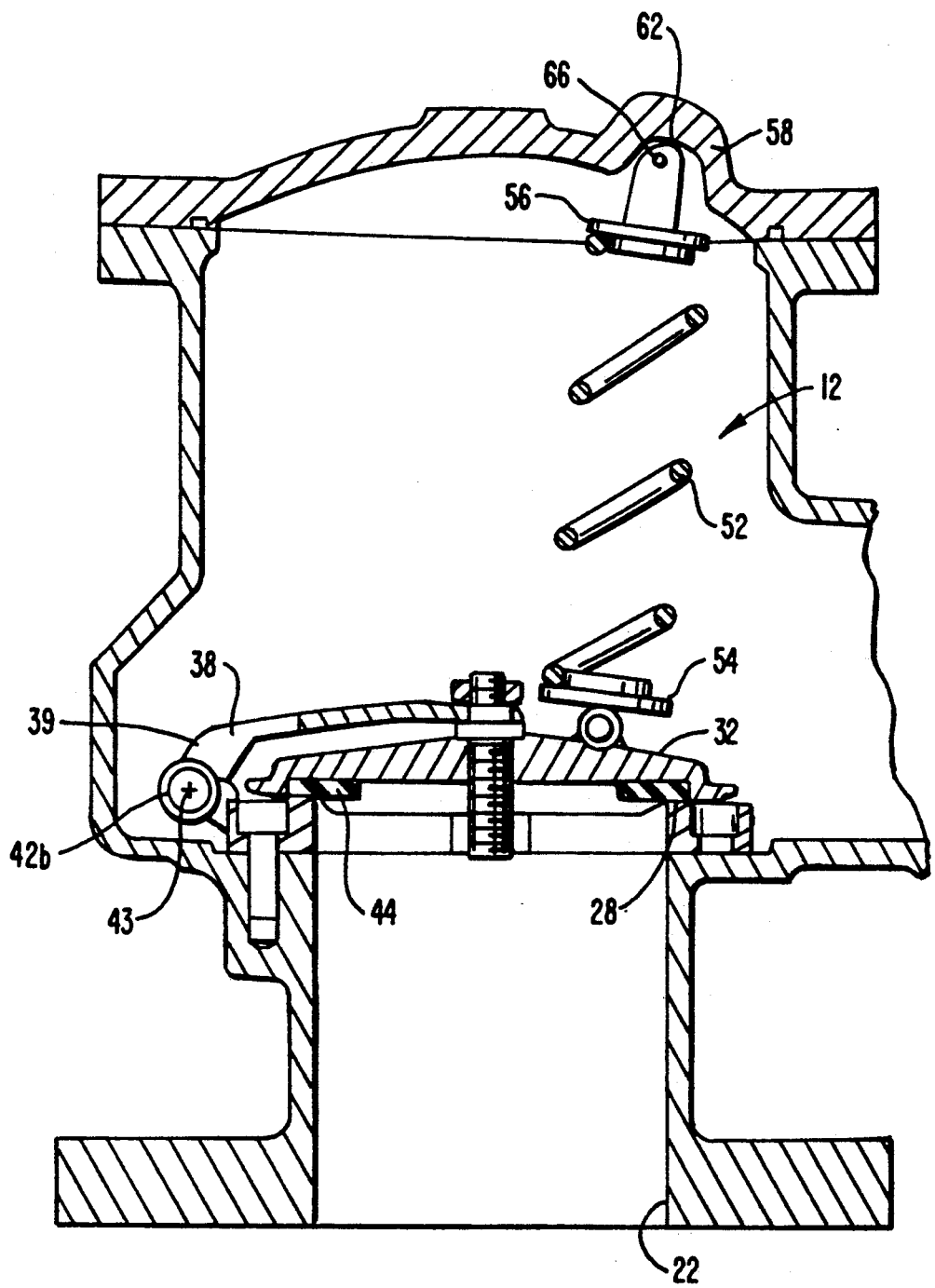
FIG._1A.

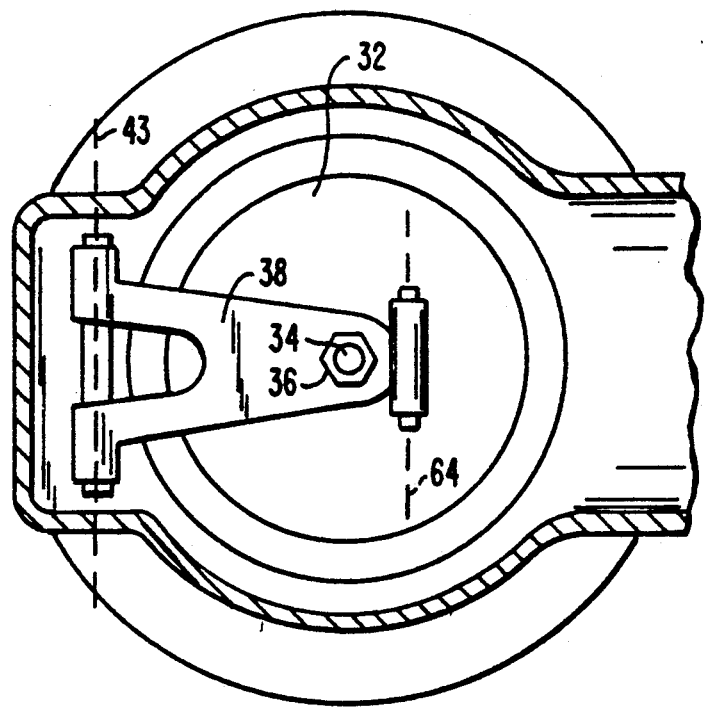
FIG._2.
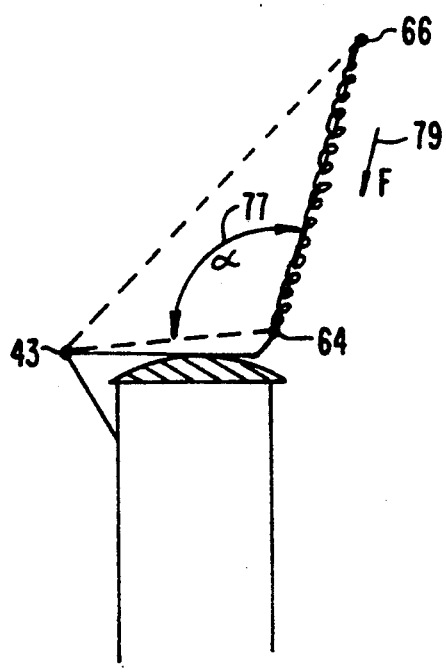
FIG._3A.
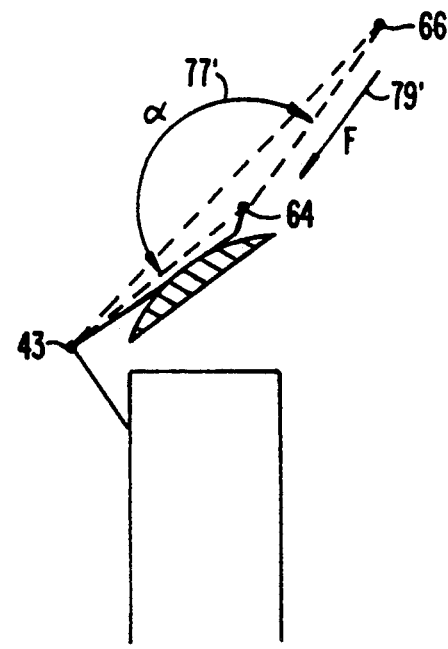
FIG._3B.

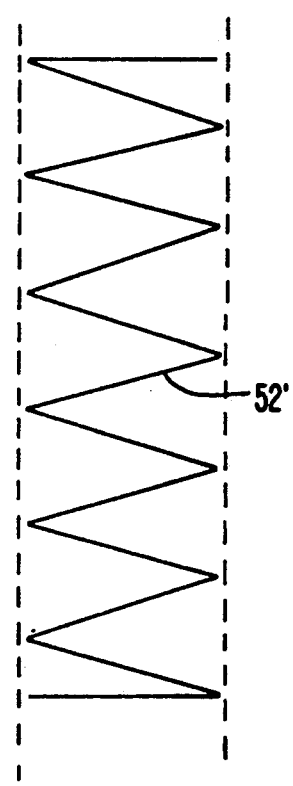
FIG._4A.
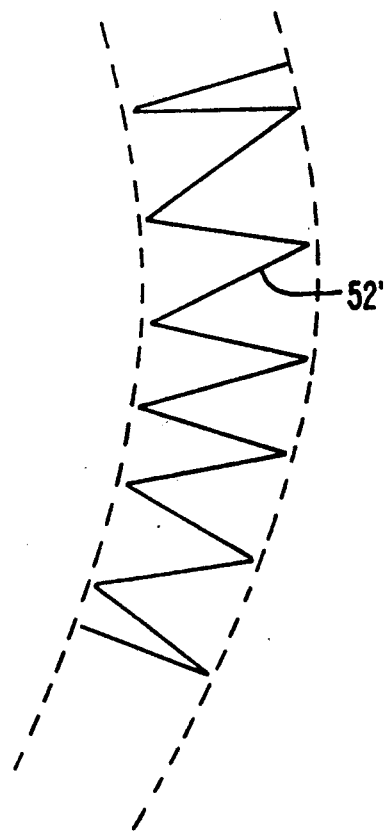
FIG._4B.
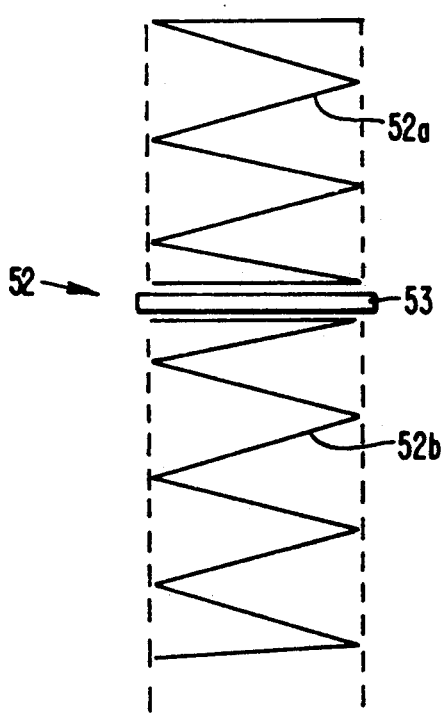
FIG._5A.
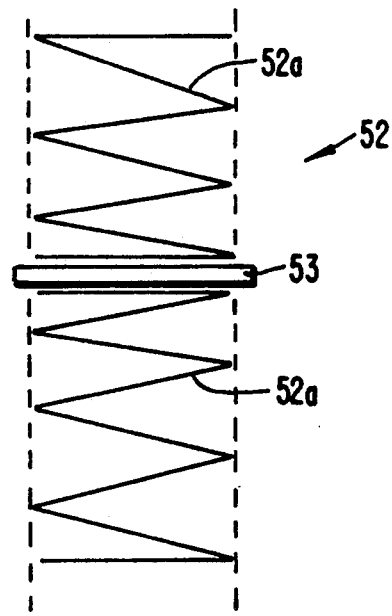
FIG._5B.

N-SHAPED BACKFLOW PREVENTOR

This application is a continuation-in-part of Serial No. 07/435,870, filed Nov. 13, 1989, for Check Valve with Reduced Hold-Open Pressure, to be issued as U.S. Pat. No. 4,989,635 on Feb. 5, 1991.

FIELD OF THE INVENTION

The present invention relates to an N-shaped backflow preventor and, in particular, to a preventor with a housing having a small footprint and high flow efficiency.

BACKGROUND OF THE INVENTION

Check valves are well known for use in assuring that a flow through a conduit occurs only in a predefined direction. Check valves are used, for example, in backflow prevention assemblies to prevent backflow of one fluid body into another. Backflow prevention is often used in connection with protecting potable water supplies from contaminants which could otherwise be introduced into it via back-siphonage or back-pressure. Many backflow preventors are designed to accommodate pressure commonly encountered in municipal water supplies, such as 150 psi (1,030 kPa) or more.

Several factors are important in designing or selecting a backflow preventor for a particular use, including performance (e.g., minimizing pressure drop), serviceability, and ease and cost of installation. In previous devices, maximizing serviceability has been incompatible with also maximizing the performance and installation factors. Thus, in past devices, efforts to increase the performance and ease of installation has produced devices with decreased serviceability. FIG. 6 depicts, schematically, a previous backflow preventor 110 which attempted to provide ease of serviceability by including both valves in 112a, 112b in a vertical configuration and a cover 114 which, when removed, permits access to the valves 112a, 112b (e.g., for maintenance purposes) in a vertical direction. The device shown in FIG. 6, however, provides a less than optimal performance. This is at least partially because, owing to the orientation of the valves 112a, 112b with respect to the inlet opening 116 and outlet opening 118 flow through the valve openings 116, 118 is forced to follow a divergent path (indicated by solid arrow streamlines 120a, 120b). The blocking action of the valve disks 122a, 122b, causing this divergent flow 120a, 120b, provides resistance to flow through the backflow preventor 110 and increases the pressure drop which the backflow preventor produces.

The device depicted in FIG. 6 also has deficiencies from the point of view of installation. In general terms, the cost of installation is least when the backflow preventor occupies the smallest amount of space. Thus, when a backflow preventor is installed in a building, it is desired to minimize the floor space required for installation. When the backflow preventor is installed outside a building, the expense of installation is related to the size of the enclosure required (e.g., enclosure 132 depicted in FIG. 7). When the backflow preventor is installed underground, it is desirable to minimize the size of the trench (not shown) required for underground installation.

As seen in FIG. 6, the inlet conduit and outlet conduit 124, 126 occupy a horizontal distance 128 which determines the minimum amount of space theoretically needed for installation of a backflow preventor. The upper portion 134 of the backflow preventor 110 occupies a horizontal extent 136 which is only slightly greater than theoretically minimum horizontal extent 128 required for installation. However, the lower portion 138 has a minimum horizontal extent 142 which is substantially greater, principally because the handle portions 144a, 144b of the shutoff valves extend outward from the housing 146 in a direction which is parallel to the axis of the conduits 124, 126 (i.e., parallel to a line passing through the conduits 124, 126). Moreover, an even larger horizontal expanse 148 is required to accommodate opening of the shutoff valves since the handles 144a, 144b move in a direction parallel to the axis of the conduits 124, 126.

FIG. 7 depicts another configuration for a backflow preventor which also has certain deficiencies. The axes 152a, 152b along which the first and second check valves 154a, 154b extend (defined, for these purposes, as a line passing through the center of the inlet port of the valves 154a, 154b and parallel to the direction of flow into the valves) are parallel and both extend at an angle of about 45° to vertical. Access for maintenance is obtained by removing covers 156a, 156b to provide openings. The openings lie in planes 158a, 158b which are inclined to the horizontal by about 45°. Because neither of the openings lies in a horizontal plane, the device does not provide for access in a vertical direction. This represents a drawback to the serviceability of the device in FIG. 7.

Installation of the device shown in FIG. 7 also has certain drawbacks. Installation requires certain additional parts such as 90° elbows 162a, 162b to change the flow direction from the upward and downward flow of the inlet and outlet conduits 124, 126 to the horizontal flow direction of a backflow preventor 164. The size of the enclosure 132 required is relatively large to accommodate the extra parts 162a, 162b and since the two shutoff valves 166a, 166b and check valves 154a, 154b are generally linearly arrayed. Because of the change in flow direction, the flanges 168a, 168b for installing the backflow preventor 164 are vertically oriented. This requires provision of supports 172a, 172b for supporting and positioning the backflow preventor 164 at least during installation. As with the device depicted in FIG. 6, the check valves 154a, 154b of the device in FIG. 7 are of a type requiring that the flow through the valves be divergent 120a, 120b around the edges of the valve disks.

FIG. 8 depicts another type of previously-provided backflow preventor also having certain deficiencies.

The axes 152c, 152d, along which the first and second check valves 154a, 154b extend, are perpendicular and both extend at an angle of 45° to vertical. Covers 156c, 156d cover access openings which lie in planes 158c, 158d, neither of which lies in a horizontal plane. Additional parts such as elbows 162c, 162d are required for installation. The two shutoff valves 166c, 166d and the two check valves 154c, 154d are generally linearly arrayed. The means for connection 168c, 168d of the inlet and outlet of the stop valves 166c, 166d are vertically oriented. The check valves 154c, 154d are of a type requiring that the flow through the valves be divergent 120a, 120b around the edges of the valve disks.

Typically, a check valve is designed to maintain its open configuration as long as there is flow through the valve. Once the flow stops or drops below a predetermined value, the check valve closes. Typically, check valves are designed so that, once the valve is closed, the inlet pressure must exceed a predetermined threshold before the valve will open. Usually, a single structure, typically a spring, is used both to provide the force to hold the valve closed (until the threshold is reached), and to provide the biasing force which moves the valve from the opened to the closed position. Because the biasing device provides some force tending to close the valve, even during normal flow conditions, a countervailing force must be provided to counteract the closing force and maintain the valve open, during normal flow conditions. Typically, the countervailing force is provided by the fluid moving through the valve. Accordingly, as the pressurized fluid moves through the valve, some amount of work is expended in holding the valve in the open position in opposition to the biasing force tending to close the valve. This expenditure of work causes a pressure drop across the check valve, so that the check valve itself necessarily creates a certain amount of loss of the pressure head. The amount of pressure minimally required at the inlet in order to maintain the valve in the open position is termed the "hold-open pressure." It is desirable to minimize the pressure drop or head loss during transit through the check valve, and, thus, it is desirable to reduce the hold-open force. Particularly, it is desirable that the hold-open force should be less than that from the threshold pressure.

Accordingly, a number of previous check valves having a biasing device have been produced, which create a greater force on the valve when it is in the closed position than when in the open position.

Many previous designs for reduced hold-open pressure check valves involve providing a linkage of one or more rigid pivoting arms connecting the clapper to the wall or body of the valve. U.S. Pat. No. 980,188, issued Jan. 3, 1911, to Blauvelt, for example, discloses a flap or swing-type valve having a clapper which can pivot toward or away from a valve seat. The clapper is pivotally connected to a rigid link or arm which, in turn, is pivotally connected to a spring.

Other valving devices include a knuckle or toggle-type linkage having two or more relatively pivoting arms or links.

SUMMARY OF THE INVENTION

The present invention includes the recognition of problems in previous devices, including those described above. It has been found that performance of backflow preventors is degraded when the number of changes in flow direction is increased. An increase in the number of changes in average streamline flow direction tends to increase pressure drop and degrade performance of a backflow preventor. As used herein, average streamlines can be considered to pass through the center of valve inlets, pass along a direction from an upstream valve outlet to a downstream valve inlet and pass along the centers of conduits elsewhere. Although the above-defined average streamline is used for purposes of explanation and analysis, it is recognized that actual flow will typically contain some amount of turbulence. Nevertheless, for purposes of explanation of the present invention, the defined and depicted streamlines approximate the general flow direction and are believed to approximate the actual streamlines averaged in space and time.

FIG. 7 depicts the average streamline 182 as dotted arrows. Tracing the flow from the upper flow in the inlet conduit 182 the downward flow in the outlet conduit 126, there is a 90° change 184a at the first elbow joint 162a, a 45° change 184b just prior to the inlet port of the first valve 154a, 90° change 184c between the inlet and outlet of the first valve 154a, a 45° change 184d downstream of the outlet of the first valve 154a, a 45° change 184e upstream of the inlet to the second valve 154b, a 90° change 184f between the inlet and the outlet of the second check valve 154b, a 45° change 184g downstream of the outlet from the second check valve 154b and a 90° change 184h at the second elbow 162b. Thus, average streamline analysis shows that there is a total of 540° of change between the inlet conduit 124 and the outlet conduit 126.

FIG. 8 shows the average streamline 182 for the configuration depicted therein. There is a 90° change 186a at the first elbow joint 162c, a 45° change 186b prior to the inlet part of the first valve 154c, a 90° change 186c between the inlet and outlet of the first valve 154c, a 90° change 186d between the inlet and outlet of the second check valve 154d, a 45° change 186e downstream of the outlet from the second check valve 154d, and a 90° change 186f at the second elbow 162d. Thus, average streamline analysis shows that there is a total of 450° of change between the inlet conduit 124 and the outlet conduit 126.

A corresponding streamline analysis of the device shown in FIG. 6 indicates a total flow change of about 180°.

The present invention provides for increased performance without unacceptably degrading serviceability or installation factors. The present invention provides for a flow through open valves without requiring the flow to diverge around the edges of the valve disks. The valve components of the present invention, rather than inhibiting flow by requiring divergence as the flow moves through the valves, tends to enhance the desired flow by directing flow along the desired path. The present invention has an average streamline flow change of direction totalling about 180°. According to an embodiment of the present invention access to one of the check valves is in a vertical direction while access to the other is in a horizontal direction. The valves preferably extend along axes which are oriented at 90 to one another.

Valves containing a relatively large number of moving parts, such as pivoting rigid arms, are typically susceptible to wear or deterioration, particularly in corrosive, contaminated, or depositional environments, such as in hard water. Furthermore, rigid linkage systems are relatively expensive to design, produce, install, and maintain. Installation and maintenance often require use of special tools.

The present invention includes a spring which connects the valve clapper to the valve body. Preferably the spring connects the clapper to a removable cover portion of the valve body. The spring can be viewed as taking the place of one or more of the rigid links of previous devices. Preferably, the spring is directly connected to the clapper device, i.e., without an intervening linkage, and forms the sole connection between the clapper device and the valve wall (preferably the cover portion of the valve wall). The spring pivots with respect to the clapper about a pivot point, with the pivot point remaining in a fixed position with respect to both the end of the spring and the clapper device during opening and closing of the valve. The spring provides a force along its longitudinal axis without a lateral component.

BRIEF DESCRIPTION OF THE DRAWINGS

FIG. 1 is a cross-sectional view through a check valving device showing a closed check valve and an opened check valve;

FIG. 1A is a partial cross-sectional view corresponding to FIG. 1, but showing another embodiment;

FIG. 2 is a cross-sectional view taken along line 2—2 of FIG. 1; and

FIGS. 3A and 3B depict, schematically, the triangles formed by the pivoting or attachment axes or points in the closed and opened configurations, respectively;

FIGS. 4A and 4B depict, schematically, an unstressed helical spring and a compressed and bowed helical spring;

FIGS. 5A and 5B depict, schematically, two end-joined helical springs, in unstressed and stressed configurations, respectively;

DETAILED DESCRIPTION OF THE PREFERRED EMBODIMENT

Figure 9:
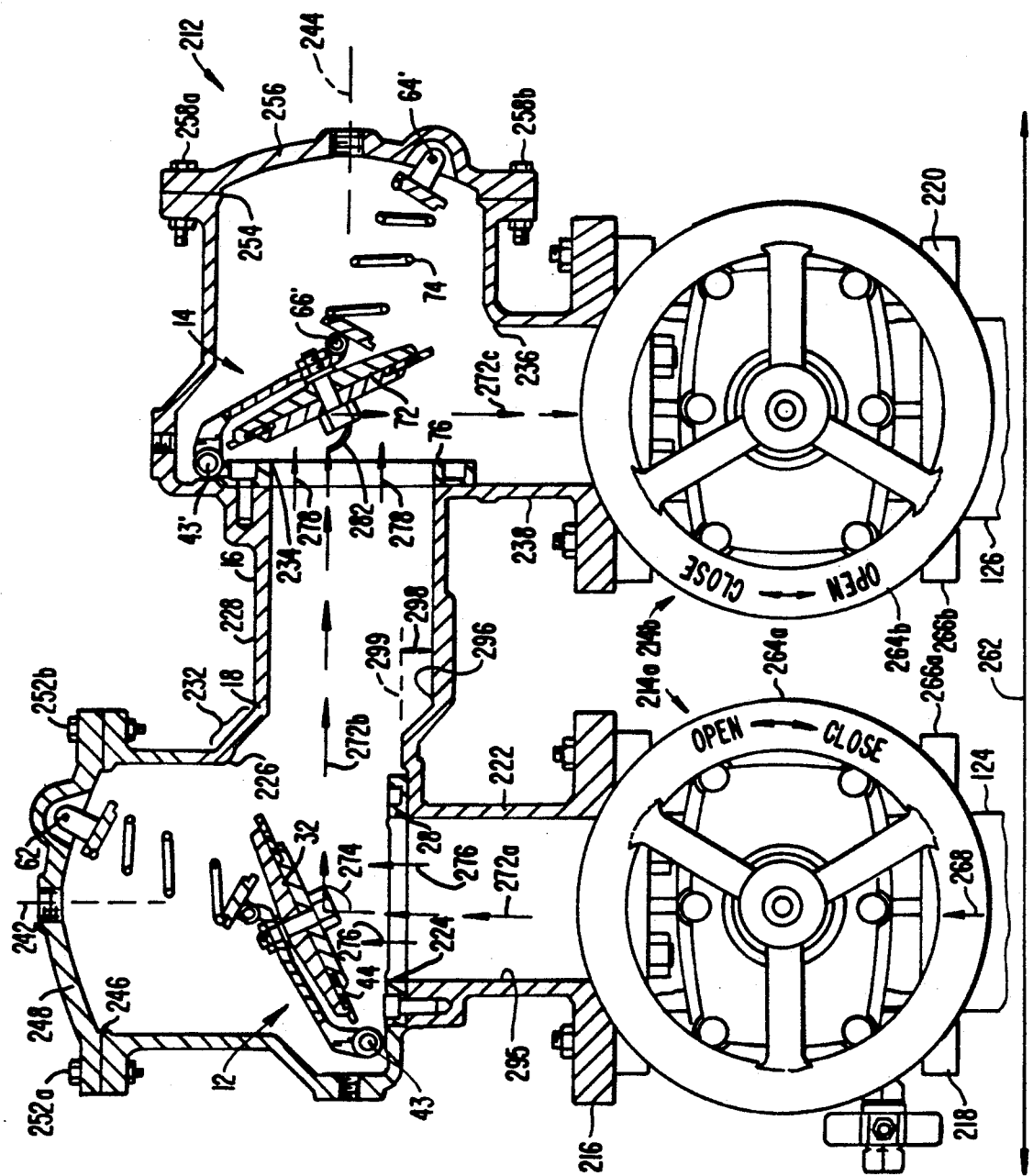
FIG. 9 is a side elevational view, partly in cross-section of a backflow preventor according to one embodiment of the present invention.

A backflow preventor 212 according to one embodiment of the present invention is depicted in FIG. 9. The backflow preventor 212 includes first and second shutoff valves 214a, 214b and first and second check valves 12, 14. The shutoff valves can be any of a number of well-known valve designs, including a ball valve, a gate valve, or, preferably, a globe valve. Preferably, the shutoff valves can be manually opened or closed by moving external handles 269a, 296b. The valves 214a, 214b, 12, 14 are encased in a housing 216 which includes an inlet lower portion 218, a valve body 16, and an outlet lower portion 220. A conduit 222 leads from the first shutoff valve 214a to the inlet port 224 of the first check valve 12. The inlet port 224 is preferably circular in shape and surrounded by a valve seat 28. The inlet port 224 can be closed by the clapper or valve disk 32. The valve disk 32 is movable between a closed configuration or position (FIG. 1) and an open configuration as depicted in FIG. 9. The flow exits the first valve region 12 through an outlet port 226 and enters a conduit 228 which provides fluid communication between the first check valve 12 and the second check valve 14. In the embodiment depicted in FIG. 9, the conduit 228 contains a first downward sloping portion 232 imparting a shape to the apparatus similar to the letter "N". At the downstream end of the conduit 228 is an inlet port 234 of the second check valve 14. Surrounding the inlet port 234 is a valve seat 76. The second check valve 14 operates in a manner substantially similar to that of the first check valve 12 as described more fully below. Flow leaves the second check valve 14 to an outlet port 236 and is conveyed by a conduit 238 to a second shutoff valve 214b.

Figure 6:
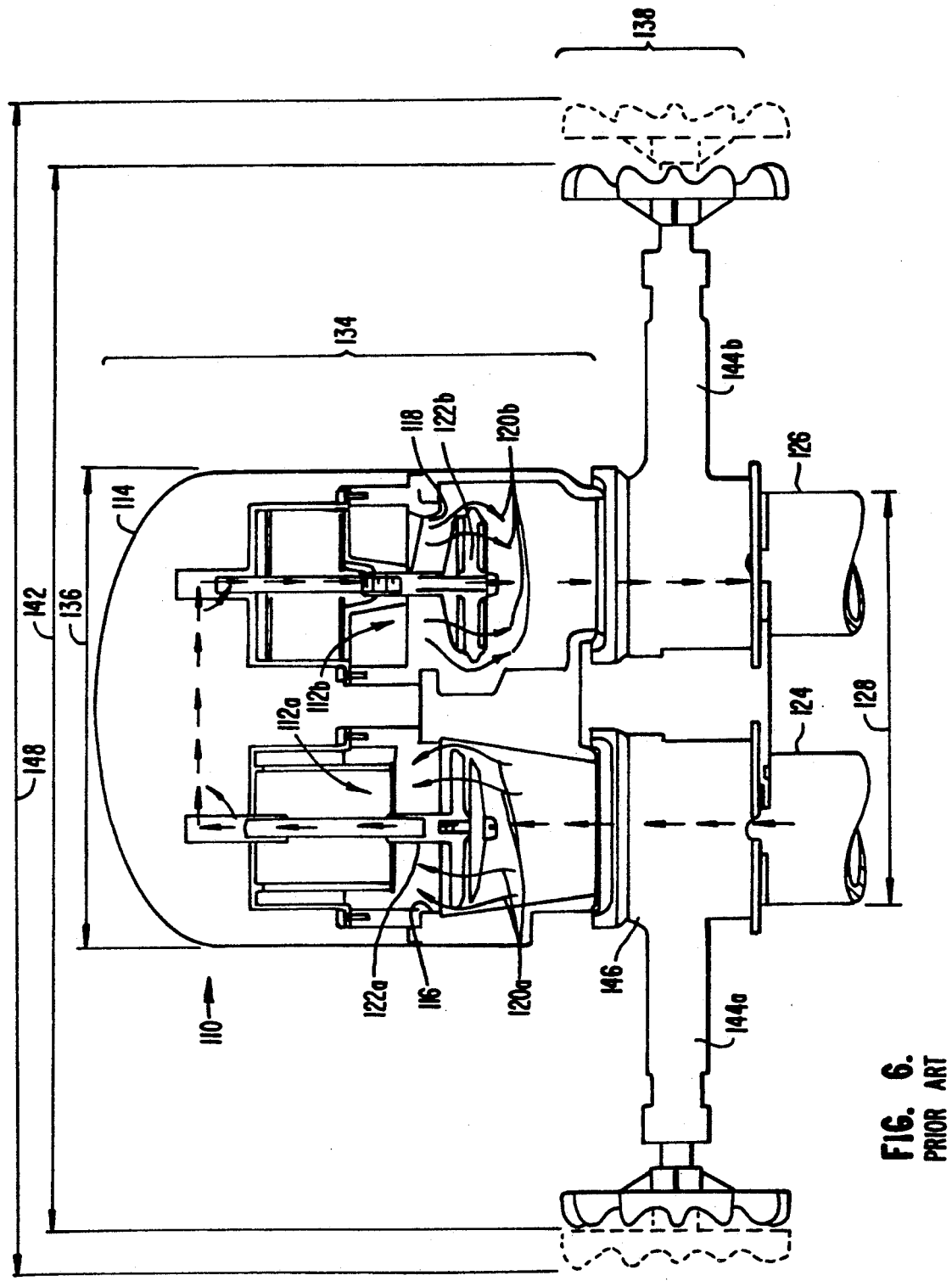
FIG. 6 is a schematic cross-sectional view of a backflow preventor according to a previous device.
Figure 7:
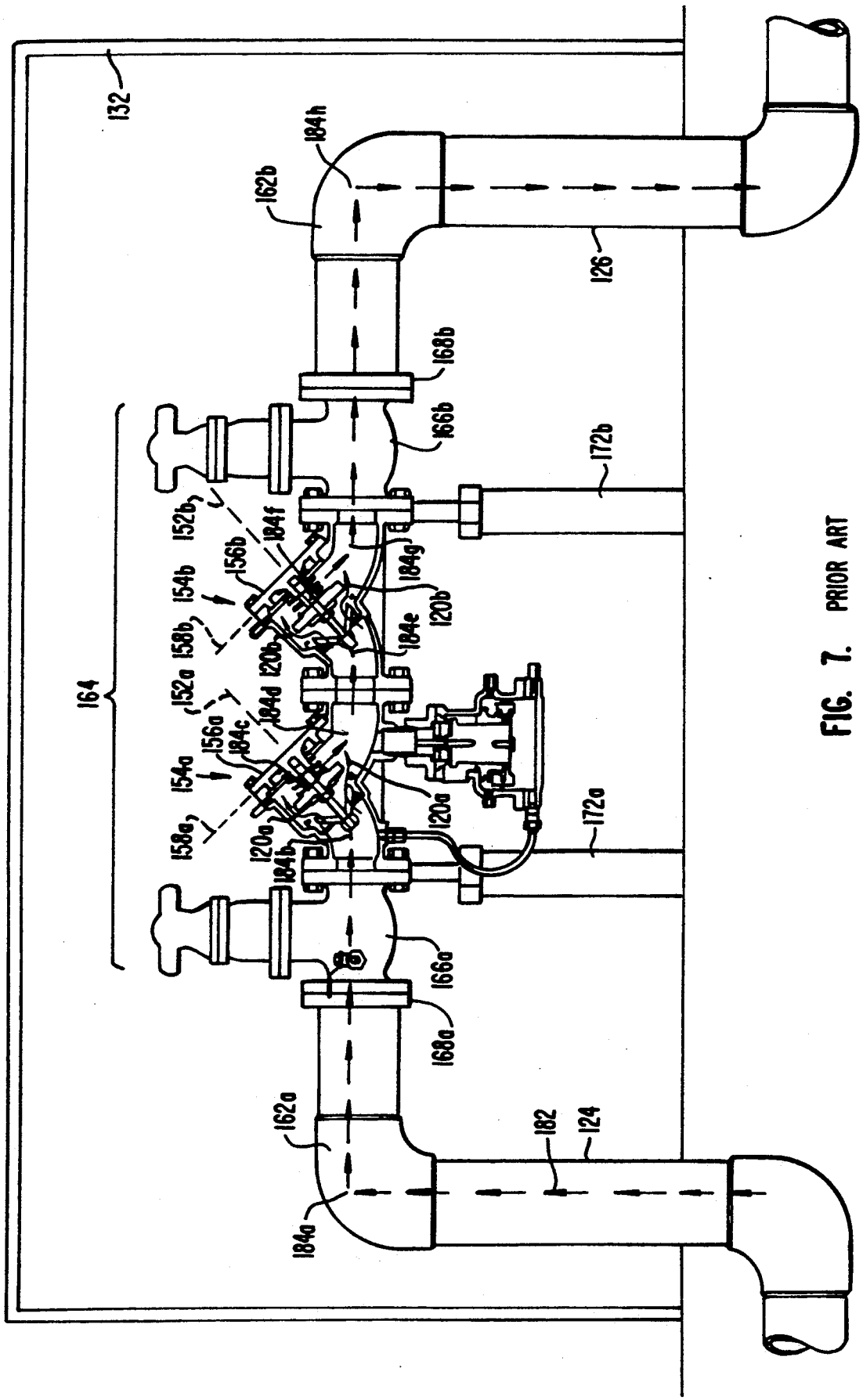
FIG. 7 is a schematic cross-sectional view of an enclosed backflow preventor according to a previous device.
Figure 8:
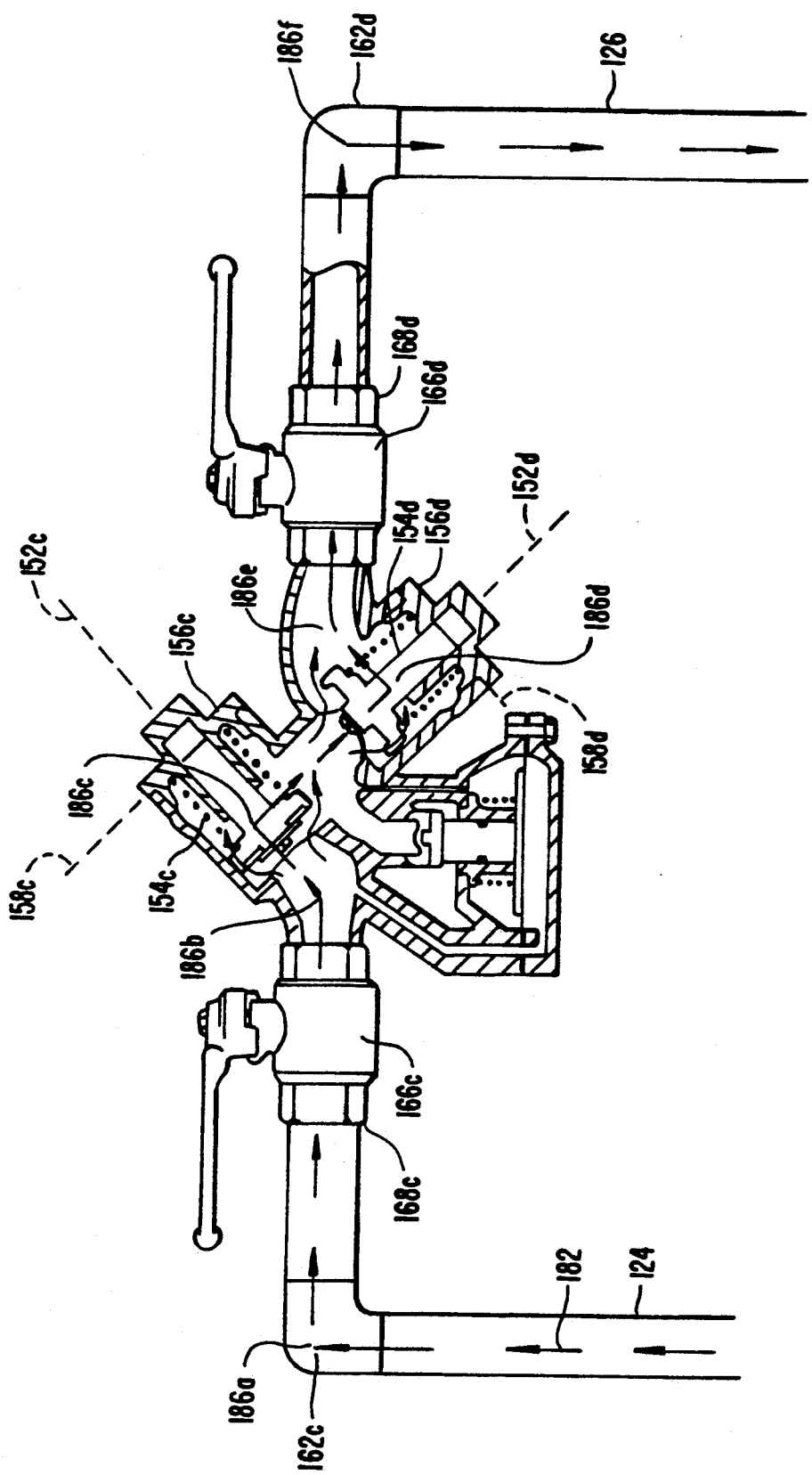
FIG. 8 is a schematic cross-sectional view of a backflow preventor according to a previous device.

As seen in FIG. 9, the first and second check valves 12, 14 are positioned generally vertically above the inlet and outlet stop valves 218, 220 and the second check valve and shutoff valve 14, 214b are substantially level, but horizontally displaced from the first check valve and shutoff valve 12, 214a. Thus, the flow from the first shutoff valve 214a to the first check valve 12, the second check valve 12 and the second shutoff valve 214b is in a generally inverted-U shaped, as opposed to a linear shape such as that depicted in FIGS. 7 and 8. In this way, the horizontal extent 262 of the backflow preventor 212 is reduced, compared to linear configurations such as those in FIGS. 7 and 8. As can be seen from FIG. 9, the horizontal extent 262 of the backflow preventor 212 is also reduced, compared to a configuration such as that depicted in FIG. 6, since the handles 264a, 264b by which the shutoff valves 214a, 214b are operated, extend in a direction perpendicular to a line connecting the inlet and outlet conduits 124, 126. The direction in which the handles 264a, 264b move as the shutoff valves 214a, 214b are opened and closed, is a direction perpendicular to a line connecting the conduits 124, 126. By providing shutoff valve handles 264a, 264b which extend and move in a direction perpendicular to the line connecting the conduits 124, 126, the horizontal extent of the backflow preventor 212, in a direction along the line connecting the conduits 124, 126 is reduced, compared to devices such as that depicted in FIG. 6.

The first check valve 12 extends generally along an axis 242. The second check valve 14 extends along an axis 244. In the embodiment depicted in FIG. 9, the second check valve extends along an axis 244 which is at approximately 90° to the axis 242 of the first check valve 12.

Figure 10:
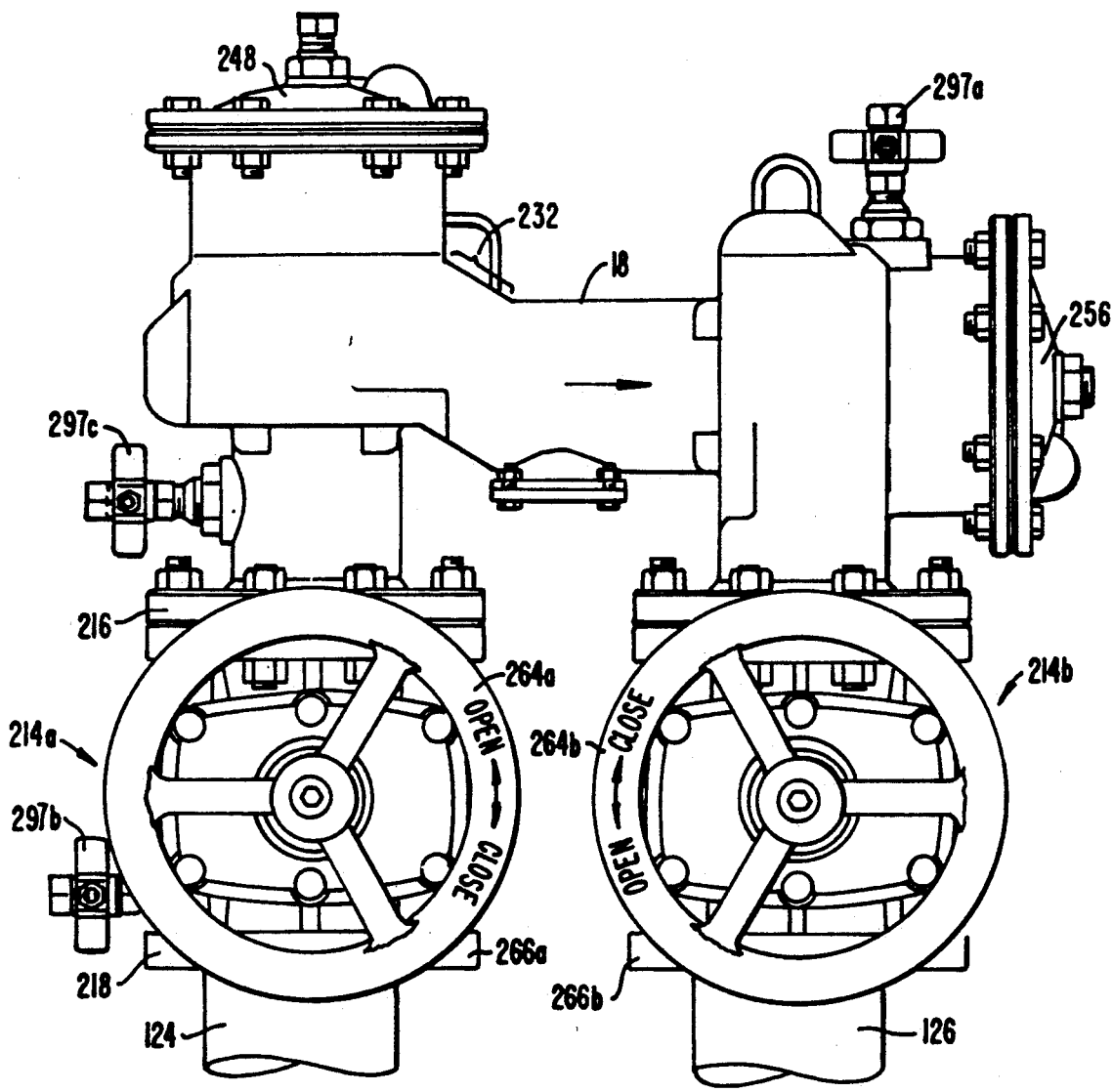
FIG. 10 is a side-elevational view of a backflow preventor according to one embodiment of the present invention.

An opening 246 is provided in the housing 216 in the region of the first check valve 12, covered by a covering 248. The covering 248 (FIG. 10) is removably held in place by bolts 252a, 252b. When access to the first check valve 12 is desired, such as for maintenance or installation, the bolts 258a, 258b are removed and the covering 248 is removed to expose the first check valve 12 through the opening 246. As can be seen from FIG. 9, access to the first check valve 12 is along a vertical direction.

A second opening 254 is provided in the housing 216 in the region of the second check valve 14. The opening 254 is covered by a covering 256 removably held in place by bolts 258a, 258b. When access to the second check valve 14 is desired, the covering 256 is removed. As can be seen from FIG. 9, access to the second check valve 214 is in a horizontal direction.

The lower portion of the backflow preventor 212 includes flanges 266a, 266b for connection to the inlet and outlet conduits 124, 126. Because the flanges 266a, 266b are horizontally oriented, the backflow preventor 212 can be positioned to rest on the inlet and outlet conduits 124, 126 during installation, thus avoiding the need for supports such as those 172a, 172b depicted in FIG. 7.

During operation, fluid enters the first shutoff valve 214a from the inlet conduit 124 in a first flow direction 268. The average streamline flow 272a continues through the conduit 222 and through the inlet port 224 without substantial change in direction until it reaches the valve disk or clapper 32. As shown in FIG. 9, because of the configuration of the valve disk 32 flows through the inlet port 224 is substantially straight 276 and non-divergent. When the flow reaches the clapper 32 (i.e., when any fluid "parcel" component of the flow reaches the clapper 32) there is a 90° change of direction 274. When the clapper 32 is in the open configuration, as depicted in FIG. 9, it is positioned so as to direct the flow (as analyzed by the position of the average streamline) from the first direction 272a (i.e., substantially vertically upward) to a second direction, 272b (i.e., substantially horizontally toward the second check valve 13). In the embodiment depicted in FIG. 9, the clapper 32 acts as a flow director because it forms a surface positioned substantially at an angle with respect to the upward flow 272a.

The flow 272b which has been redirected by the clapper 32 exits the outlet port 226 and flows through the conduit 228 towards the second check valve 14. The flow 272b passes through the inlet port 234 of the second check valve 14. During such passage, the flow is substantially straight and non-divergent 278. The flow 272b proceeds from the first check valve 12 to the second check valve 14 substantially without change of direction until it reaches the clapper 72 of the second check valve 14. The clapper 72 acts as a flow director, in a manner similar to that of the first clapper 32, redirecting the flow 272b to a vertically downward direction to 272c. Thus, there is a second 90° change in flow direction 282 of the average streamline 272. As can be seen from FIG. 9, the total change in direction of the average streamline 272 is the sum of the two changes of direction 274, 282, both of which are approximately 90°, providing a total of about 180° of change in direction.

Figure 11:
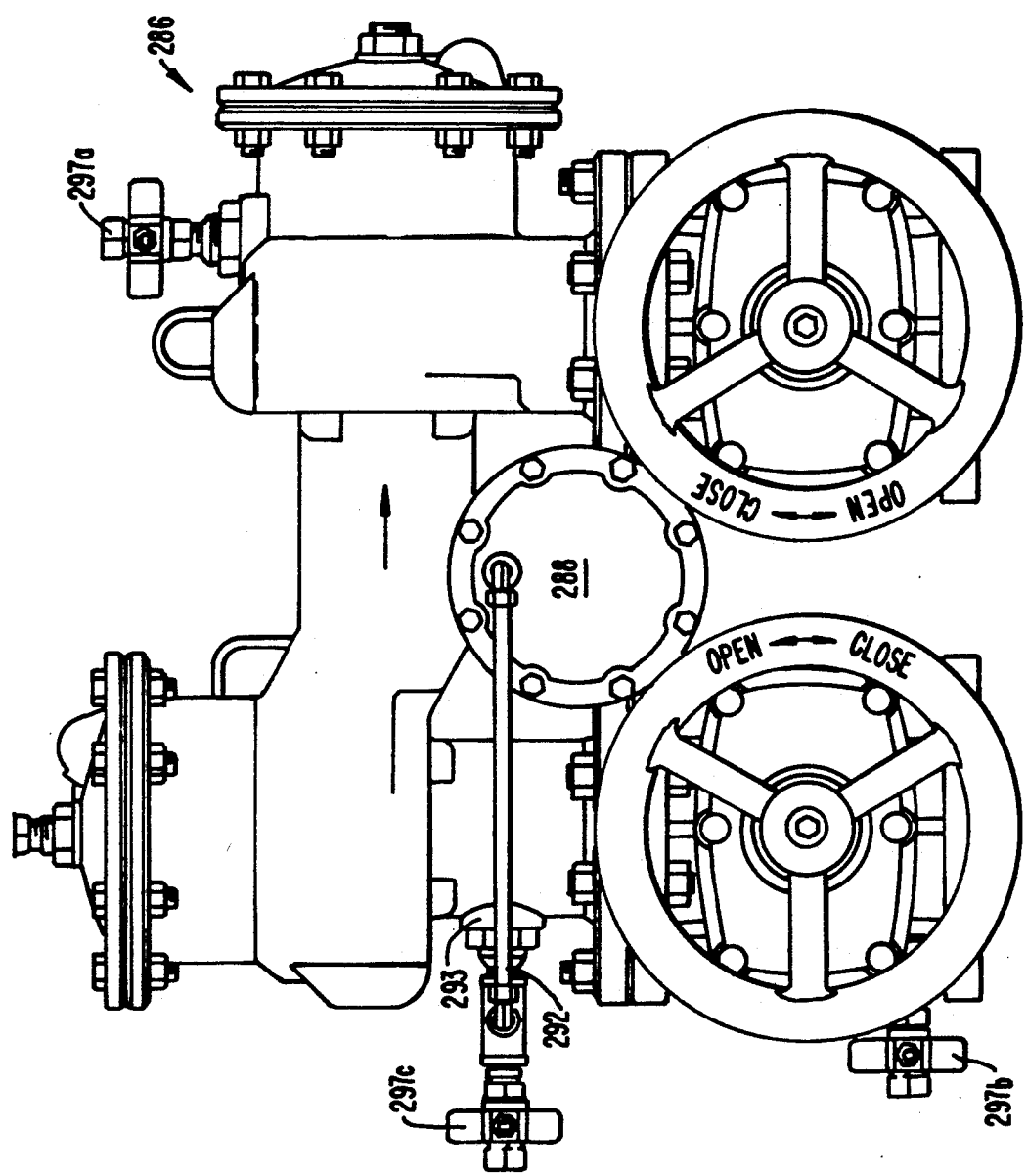
FIG. 11 is a side-elevational view of a backflow preventor according to a second embodiment of the present invention.

FIG. 11 depicts a backflow preventor 286 according to a second embodiment of the invention. The backflow preventor 286 depicted in FIG. 11 is substantially similar to the backflow preventor depicted in FIG. 10 except for the addition of a relief valve 288 and a conduit 292. The relief valve 288 is provided in order to discharge possibly contaminated water into the atmosphere to prevent its entering the water source. A number of relief valves of types well-known in the art can be used. The relief valve 288 and conduit 292 are connected to the housing 216 in two places. The conduit 292 connects the relief valve 288 to a portion of the housing 293 which is upstream of the first check valve 12. The relief valve 288 is also connected to a region 296 (FIG. 9) which is downstream of the first check valve 12. For proper operation, the region 296 should be a distance 298 below the level 299 of the inlet port 224 for the first check valve 12. This change in level 298 is provided by the downward sloping portion 232. In operation, when pressure at the upstream location 293 falls below a predetermined level with respect to pressure in the valve interior, the valve 288 opens to permit discharge of water.

Test cocks 297a, 297b, 297c are connected to the housing 216 in order to provide a position for pressure testing, e.g., by connecting a differential pressure gauge.

As depicted in FIG. 1, a check valving device 10 is provided having a first check valve 12 and a second check valve 14. Although FIG. 1 depicts the first check valve 12 in a closed position, and the second check valve 14 in an open position, in actual operation, as described more fully below, the first and second valves 12, 14 will open and close substantially simultaneously or within a short time interval of one another. The valving device includes a valve body 16 made up of a wall 18. The valve body 16 can be formed of a number of materials, including ductile iron, brass, stainless, steel, or other metals, plastic, resin, glass, and/or ceramic and the like. The valve body 16 defines an inlet port 22 and an outlet port 24, preferably having a substantially circular cross-section. Preferably, the inlet port and outlet port include devices, such as flanges 26, for connecting the valving device 10 to fluid conduits. Adjacent to the inlet port 22 is a valve seat 28, such as an annular seat formed, for example, of iron.

A disk-shaped clapper 32 is rigidly connected, such as by using a bolt 34 and nut 36, to a clapper arm 38. A first end 39 of the arm 38 is pivotally mounted adjacent the valve seat 28 by connection to a portion of the valve body 16 by a pivot joint 42a, 42b to permit pivoting of the arm 38, and rigidly attached to disk 32 about a first axis 43.

The lower surface of the clapper 32 includes a seat disk 44 configured to sealingly mate with the valve seat 28 when the clapper 32 is pivoted to its closed position, as depicted in the left portion of FIG. 1. The disk 44 can be made of a number of materials, including plastic, rubber, resin, and the like, and is preferably a soft (such as about 40 urometer) elastomer material, such as a synthetic rubber e.g., EPDM (ethylene-propylene terpolymer). The disk 44 is reversible so that after it experiences wear, it can be removed, rotated 180° about a horizontal plane, and reinstalled.

The second end 48 of the clapper arm 38 is pivotally connected to a spring 52. The spring 52 is contained between first and second spring seats 54, 56. The spring 52 is preferably a helical spring which is compressional, i.e., is reduced in length as the valve 12 opens. The spring 52 can be formed of a number of materials, such as spring steel, plastic, or rubber. A single helical spring 52', such as that depicted in FIG. 4A, is commonly subject to deformation when compressed. As shown in FIG. 4B, a compressed helical spring commonly assumes a bowed or arcuate configuration. Although such a spring can be used in accordance with the present invention, according to the preferred embodiment, two springs 52A, 52B are joined end-to-end by connection to a plate-like or annular device, such as a washer 53, as depicted in FIG. 5A. Upon compression, as depicted in FIG. 5B, such a spring 52 tends to maintain its linear configuration and is not subject to bowing or distortion to the degree an ordinary helical spring 52B is.

The first spring seat 54 is pivotally attached to the second end 48 of the clapper arm 38 to permit pivoting of the spring 52 about a second axis 64.

The second spring seat 56 is pivotally connected to the valve body wall 18. In the preferred embodiment, the portion of the valve wall which the second spring seat 56 connects to is a removable cover 65 which can be attached to the remainder of the valve body wall 18, by e.g., bolts, screws, clamps, or the like (not shown). As shown in FIG. 1, the second spring seat 56 can be connected within a pocket 58 at an attachment point 62, to permit pivotal movement of the spring 52 about a third axis 66.

In the embodiment depicted in FIG. 1, the second valve 14 is positioned downstream from the first valve 12. Preferably, the second valve 14 is identical in construction to the first valve 12, and includes a clapper 72, a biasing device, such as a spring 74, and a valve seat 76. It will be understood, however, that the present invention can be used in single check valve configurations or other types of valve configurations.

Viewed in cross-section, each of the two valves 12, 14 define a triangle having vertices at the first axis 43, 43', second axis 64, 64', and third axis 66, 66', respectfully. When the valve 12 is closed, the spring biasing device 52 provides a force to the clapper 32, tending to hold the clapper 32 in the closed position. The amount of force is dependent upon two factors: (1) the magnitude of the longitudinal force provided by the spring 52; and (2) the component of that force which acts in a direction tending to close the clapper 32. As depicted in FIGS. 3A and 3B, the spring closing force can be described as $$\mathrm{Sin}(180°-\alpha)\cdot\overline{F} \qquad (1)$$

where $\alpha$ 77, 77' is the angle formed between the lines containing the first and second axes 43, 64, and the line containing the second and third axes 64, 66, and $\overline{F}$ 79, 79' is the vector force provided by the spring along the longitudinal spring axis which intersects the second axis 64 and third axis 66.

When the inlet pressure exceeds the outlet pressure, an opening force is created. When the opening force on the clapper 32 exceeds the spring closing force (shown in equation (1) plus any closing forces provided by other sources, such as fluid pressure the clapper 32 moves away from the valve seat 28, opening the valve 12 to provide fluid communication between the inlet port and the outlet port 24. During the opening movement of the valve 12, the position of the second axis 64 changes with respect to the valve body 10, but does not change with respect to the clapper 32 or with respect to the adjacent end of the spring 52.

As the clapper 32 pivots about the first axis 43, the angle $\alpha$ increases from a value of about 118° 77 in the configuration shown on the left-hand portion of FIG. 1 (depicted schematically in FIG. 3A) to a value of about 164° 77' when in the fully opened configuration of the valve 14, shown on the right-hand portion of FIG. 1 (depicted schematically in FIG. 3B). The magnitude of the closing force provided to the clapper 32 thus changes from about 87% of that of the spring force $\overline{F}$ 79 to about 27% of that of the spring force $\overline{F}$ 79'. However, during this time, the magnitude of spring force $\overline{F}$ also changes, since it is proportional to the length of the spring 52, becoming larger as the valve 12 opens. In order to produce a valve 12 having a reduced hold-open force, the extreme values of the angle $\alpha$ 77, 77', the distance between the first and third axes 43, 66, and first and second axes 43, 64 are selected so that equation (1) yields a smaller closing force in the opened position of the valve (FIG. 3B) than in the closed position of the valve (FIG. 3A).

The particular values for the hold-open force, maximum tolerable head loss, and the threshold opening pressure will depend upon the particular use or application of the valving device 10. In one embodiment of the present invention, valving device 10 opens when the inlet pressure exceeds the outlet pressure by about 2-5 psi (about 14-35 kPa), and closes when the outlet pressure equals or exceeds the inlet pressure. Preferably, this embodiment has a head loss of less than 2 psi in a static or no-flow (limiting) condition, and there is little increase in head loss as the flow increases, such as a head loss of about 3 psi (about 20 kPa), with an operational flow velocity of about 7.5 ft./sec. (about 2.3 meters/sec.), or a rated flow velocity, e.g., 18 ft./sec. (about 5.5 meters/sec.) In another embodiment, the static condition head loss is about 8 psi (about 56 kPa), and the head loss during flow conditions remains below about 10 psi (about 70 kPa).

Based on the above description, a number of advantages of the present invention are apparent. The backflow preventor in the present invention has enhanced performance, such as lower pressure drop, has a decreased number of changes of flow direction and reduces or eliminates divergent flow around the edges of valve disks. The present invention provides for ease of installation by reducing the number of parts needed, reducing the size of the square footage needed for an enclosure or pit, and by eliminating the need for supports during installation. The present invention produces these benefits without substantial degradation of serviceability by providing for vertical access to at least one check valve with horizontal access to the other check valve. By providing a device in which the valves are aligned 90° to each other and in which the total change of direction is about 180°, a backflow preventor is provided which has enhanced performance without substantial degradation of serviceability. The valve of the present invention reduces or eliminates rigid pivoting links. By reducing or eliminating links, the valve is made easier to design, produce, install, and maintain, and, in the preferred embodiment, can be installed and maintained without the use of special tools. The valve provides sufficient closing force and hold-closed force, while having a hold-open force which is low enough to produce a small head loss.

A number of modifications and variations of the invention can be used. The backflow preventor described above, in particular the housing and flow configuration, can be used in conjunction with check valves other than the check valves described, such as flapper valves with other types of biasing mechanisms. A single check valve of the type described can be used without being provided in conjunction with a second such check valve. The valve can be used for purposes other than as a backflow preventor. The check valve of the present invention can be used in combination with other valves or fluid-control devices. The valve can be used with fluids other than liquids. The valve can be configured without using a clapper arm, such as by directly pivoting the spring to the clapper and/or directly pivoting the clapper adjacent the valve seat. Other shapes and geometries of the clapper, ports, valve seats, and other components can be used. Other types of biasing devices can be used, including springs other than helical springs, hydraulic biasing devices, and the like.

Although the description of the invention has included a description of a preferred embodiment and certain modifications and variations, other modifications and variations can also be used, within the scope of the invention, which are described by the following claims.

What is claimed is:

1. A backflow preventor apparatus for connection to parallel, oppositely-flowing inlet and outlet conduits, comprising:

a housing configured to accommodate first and second valves, and to receive fluid flow from said inlet conduit flowing in a first direction;

a first valve mounted in said housing having a first clapper movable between an open configuration permitting flow through said first valve and a closed configuration preventing flow;

a second valve mounted in said housing having a clapper movable between an open configuration permitting flow through said second valve and a closed configuration preventing flow;

said first valve clapper, when in said open configuration, being positioned to direct said flow from first direction to provide flow in a second direction, different from said first direction, towards said second valve;

said second valve clapper, when in said open configuration, being positioned to direct said flow from said second direction to a third direction, different from said second direction towards said outlet conduit.

2. Apparatus, as claimed in claim 1, further comprising:

at least a first shutoff valve connected to said housing, operable by a handle extending substantially horizontally outward from said housing in a direction substantially perpendicular to a line passing through said inlet and outlet conduits.

3. Apparatus, as claimed in claim 1, further comprising:

at least a first shutoff valve connected to said housing, operable by a handle which, during opening and closing of said shutoff valve, moves substantially horizontally outward from said housing in a direction substantially perpendicular to a line passing through said inlet and outlet conduits.

4. Apparatus, as claimed in claim 2, further comprising:

a second shutoff valve positioned between said housing and one of said inlet and outlet conduits.

5. Apparatus, as claimed in claim 1, wherein said housing includes a valve body having at least first and second ports, one of said ports being an inlet port and the other of said ports being an outlet port, and wherein at least one of said first and second valves includes a valve seat adjacent to said first port;

a clapper configured to sealingly mate with said valve seat, said clapper pivotally attached adjacent to said valve seat to pivot about a first axis between a first position, wherein said clapper sealingly mates with said valve seat and at least a second position spaced from said valve seat;

first means for biasing said clapper in a direction toward said first position, said means for biasing having a first end and a second end, and forming a compressible connection between said clapper in said first position and said valve body;

second means, adjacent said first end, for attaching said means for biasing to said valve body at an attachment point; and third means, adjacent said second end, for pivotally attaching said means for biasing to said clapper to permit pivoting of said means for biasing with respect to said clapper about a second axis, wherein the position of said second axis, with respect to said clapper and with respect to said second end, remains fixed during movement of said clapper from said first position to second position.

6. Apparatus, as claimed in claim 1, wherein said housing includes a valve body having at least an inlet port and an outlet port, and wherein at least one of said first and second valves includes:

an annular valve seat adjacent to said inlet port;

a disk-shaped clapper configured to sealingly mate with said annular valve seat;

an arm rigidly attached to said clapper having a first end and a second end, said first end being pivotally attached adjacent to said inlet port to permit pivoting of said clapper about a first axis from a first position sealingly mating with said valve seat to a second position spaced from said valve seat to permit fluid flow through said inlet port; and a helical compression spring having first and second spring ends, said first spring end pivotally attached to said valve body to permit pivoting of said spring about a second axis, said second spring end directly pivotally attached to said second end of said arm, to permit pivoting of said spring with respect to a third axis said spring producing a force along a first longitudinal spring axis definable with respect to said first spring end and said second spring end, said force having a closing component which biases said clapper to move in a direction toward said first position, said force being direct along a line passing through said second axis and said third axis substantially without a lateral force component in any clapper position, said closing component being greater when said clapper is in said first position than when said clapper is in said second position.

7. Apparatus, as claimed in claim 1, wherein said first valve, when in said closed configuration, is adjacent a valve seat, said valve seat positioned at a first level, and wherein said housing includes:

a conduit connecting said first and second valves, said conduit having at least a first portion sloping downward to provide a region at a level below the level of said valve seat of said first valve.

8. Apparatus, as claimed in claim 1, further comprising a relief valve connected to said housing by at least a first conduit, said first conduit providing fluid communication with a first region of said housing upstream of said first valve and connected to said housing to provide fluid communication with a second region of said housing downstream of said first valve.

9. A backflow preventor apparatus for connection to parallel, oppositely-flowing inlet and outlet conduits, comprising:

a housing configured to accommodate first and second valves, and to receive fluid flow from said inlet conduit flowing in a first direction;

a first valve mounted in said housing having a first clapper movable between an open configuration permitting flow through said first valve and a closed configuration preventing flow;

a second valve mounted in said housing having a clapper movable between an open configuration permitting flow through said second valve and a closed configuration preventing flow;

said first valve clapper, when in said open configuration, being positioned to direct said flow from said first direction to provide flow in a second direction towards said second valve;

said second valve clapper, when in said open configuration, being positioned to direct said flow from said second direction to a third direction towards said outlet conduit;

first and second openings in said housing, said first opening providing access to said first valve and said second opening providing access to said second valve, one of said first and second openings lying in a substantially horizontal plane, the other of said openings lying in a substantially vertical plane; and first and second removable coverings for said openings.

10. A backflow preventor apparatus for connection to parallel, oppositely-flowing inlet and outlet conduits, comprising:
- a housing configured to accommodate first and second valves, and to receive fluid flow from said inlet conduit flowing in a first direction;
- a first valve mounted in said housing having a seatable valve disc having an edge, movable between a closed configuration preventing flow and an open configuration permitting flow in the absence of substantial divergent flow around the edge of said first valve disc, said first valve lying substantially in a first plane when said first valve is in said open configuration;
- a second valve mounted in said housing having a seatable valve disc having an edge, movable between a closed configuration preventing flow and an open configuration permitting flow in the absence of substantial diverging flow around the edge of said second valve disc, said second valve lying in a plane substantially perpendicular to said first plane when said second valve is in said open configuration;
- said fluid flow having an average streamline path between said inlet conduit and said outlet conduit.

11. Apparatus, as claimed in claim 10, wherein the sum of changes in flow direction of said average streamline path is not substantially greater than about 180 degrees.

12. A backflow preventor apparatus for connection to parallel, oppositely-flowing inlet and outlet conduits, comprising:
- a housing configured to accommodate first and second valves, and to receive fluid flow from said inlet conduit flowing in a first direction;
- a first valve mounted in said housing having a seatable valve disc having an edge, movable between a closed configuration preventing flow and an open configuration permitting flow in the absence of substantial divergent flow around the edge of said first valve disc;
- a second valve mounted in said housing having a seatable valve disc having an edge, movable between a closed configuration preventing flow and an open configuration permitting flow in the absence of substantial diverging flow around the edge of said second valve disc;
- said fluid flow having an average streamline path between said inlet conduit and said outlet conduit wherein the sum of changes in flow direction of said average streamline path is not substantially greater than about 180 degrees;
- said first valve disc, when in said open configuration, being positioned to direct said flow from said first direction to provide flow in a second direction, different from said first direction, towards said second valve;
- said second valve disc, when in said open configuration, being positioned to direct said flow from said second direction to a third direction, different from said second direction, towards said outlet conduit.

13. A backflow preventor apparatus for connection to parallel, oppositely-flowing inlet and outlet conduits, comprising:
- a housing configured to accommodate first and second valves, and to receive fluid flow from said inlet conduit;
- a first valve mounted in said housing having a seatable valve disc having an edge, movable between a closed configuration preventing flow and an open configuration permitting flow through a first inlet port in a first direction, said first valve mounted to extend along an axis defined by said first direction;
- a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;
- said fluid flow having an average streamline path between said inlet conduit and said outlet conduit, wherein the sum of changes in flow direction of said average streamline path is not substantially greater than about 180 degrees.

14. A method for preventing backflow between parallel, oppositely-flowing inlet and outlet conduits, comprising:
- providing a housing configured to accommodate first and second valves, and to receive fluid flow from said inlet conduit flowing in a first direction;
- mounting a first valve in said housing, said first valve having a first clapper movable between an open configuration permitting flow through said first valve and a closed configuration preventing flow;
- mounting a second valve in said housing, said second valve having a clapper movable between an open configuration permitting flow through said second valve and a closed configuration preventing flow;
- attaching said housing to said inlet and outlet conduits;
- directing said flow from said first direction to provide flow in a second direction, different from said first direction, towards said second valve, using said first valve clapper, when in said open configuration; and
- directing said flow from said second direction to a third direction, different from said second direction, towards said outlet conduit, using said second valve clapper, when in said open configuration.

* * * * *

REEXAMINATION CERTIFICATE (4790th)
United States Patent
Dunmire

(10) Number: US 5,107,888 C1
(45) Certificate Issued: Jun. 3, 2003

(54) N-SHAPED BACKFLOW PREVENTOR

(75) Inventor: Charles W. Dunmire, Fresno, CA (US)

(73) Assignee: Core Industries Inc., Fresno, CA (US)

Reexamination Request:
No. 90/005,902, Jan. 3, 2001

Reexamination Certificate for:
Patent No.: 5,107,888
Issued: Apr. 28, 1992
Appl. No.: 07/650,799
Filed: Feb. 5, 1991

Related U.S. Application Data

(63) Continuation-in-part of application No. 07/435,870, filed on Nov. 13, 1989, now Pat. No. 4,989,635.

(51) Int. Cl.$^7$ ............................................... F16K 15/03
(52) U.S. Cl. .................... 137/527; 137/512; 137/614.2; 251/337
(58) Field of Search ............................ 137/512, 512.3, 137/527, 527.2, 527.4, 614, 614.2; 251/303, 327

(56) References Cited

U.S. PATENT DOCUMENTS

| | | | |
|---|---|---|---|
| 838,001 A | 12/1906 | Bonnell et al. | 137/614.2 |
| 2,770,314 A | 11/1956 | Powell | 137/512 |
| 3,990,471 A | 11/1976 | Schutzer et al. | 137/597 |

FOREIGN PATENT DOCUMENTS

| | | |
|---|---|---|
| DE | 2450465 | 10/1974 |
| DE | 3330409 | 8/1983 |

*Primary Examiner*—A. Michael Chambers

(57) ABSTRACT

A backflow preventor with increased performance, and increased ease of installation is provided. The check valves are configured to assist in redirecting flow along the desired pathway, when they are in the open position. The pathway is designed so that the number of changes of flow direction of the average streamline flow is reduced, preferably being about 180°. The check valves are configured to reduce or eliminate divergent flow around the edges of the valve disks. A check valve with a reduced hold-open pressure includes a biasing device, such as a spring, directly connected to a pivoting clapper at one end and to the valve body at the other end. No intervening pivoting links are used between the spring and the clapper. Preferably, the clapper is connected only by being pivoted to the valve body and by the spring connecting it to the valve body.

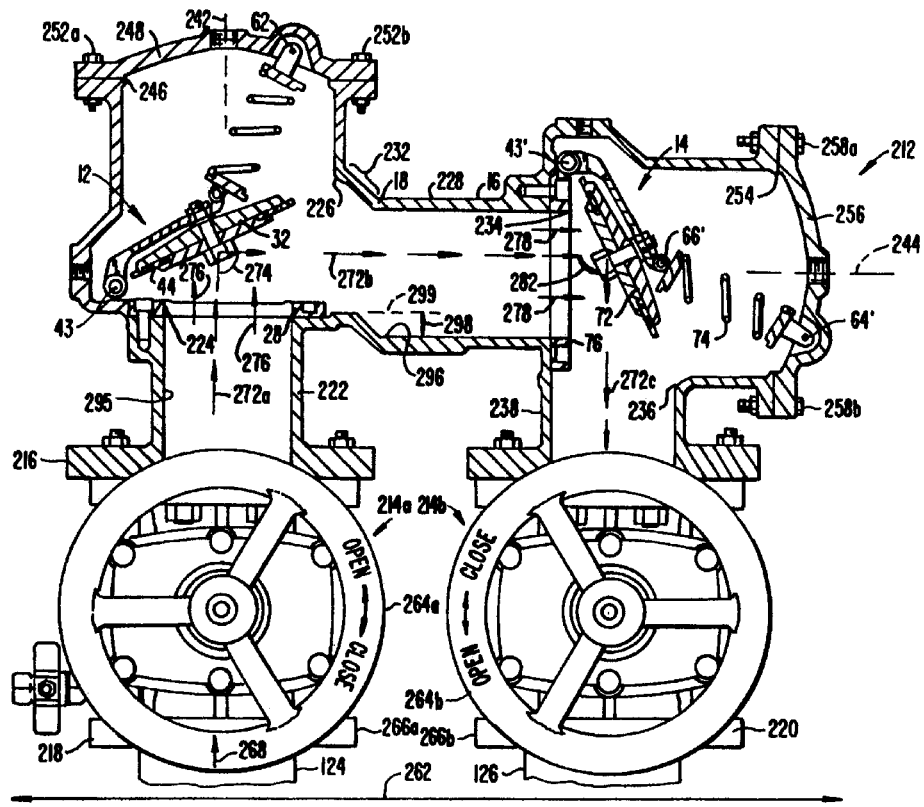

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–14 are cancelled.

New claims 15–25 are added and determined to be patentable.

*15. A backflow preventor apparatus for connection to parallel, oppositely-flowing inlet and outlet conduits, comprising:*

*a housing configured to accommodate first and second valves, and to receive fluid flow from said inlet conduit;*

*a first valve mounted in said housing having a seatable valve disc having an edge, moveable between a closed configuration preventing flow and an open configuration permitting flow through a first inlet port in a first direction, said first valve mounted to extend along an axis defined by said first direction;*

*a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;*

*said fluid flow having an average streamline path between said inlet and said outlet conduit, wherein the sum of changes in flow direction of said average streamline path is not substantially greater than about 180 degrees,*

*further comprising a first flange for coupling to said inlet conduit and a second flange for coupling to said outlet conduit wherein said first and second flanges are substantially horizontal.*

*16. An apparatus, as claimed in claim 15 wherein said first and second flanges include holes for accommodating bolts for coupling to said inlet and outlet conduits.*

*17. An apparatus, as claimed in claim 15, wherein said substantially horizontal conduits lie in substantially the same horizontal plane.*

*18. A backflow preventor apparatus for connection to parallel, oppositely-flowing inlet and outlet conduits, comprising:*

*a housing configured to accommodate first and second valves, and to receive fluid flow from said inlet conduit;*

*a first valve mounted in said housing having a seatable valve disc having an edge, moveable between a closed configuration preventing flow and an open configuration permitting flow through a first inlet port in a first direction, said first valve mounted to extend along an axis defined by said first direction;*

*a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;*

*said fluid flow having an average streamline path between said inlet and said outlet conduit, wherein the sum of changes in flow direction of said average streamline path is not substantially greater than about 180 degrees,*

*further comprising a connecting conduit coupling said first and second valves.*

*19. An apparatus, as claimed in claim 18, wherein at least a portion of said connecting conduit is downward sloping.*

*20. A backflow preventor apparatus for connection to parallel, oppositely-flowing inlet and outlet conduits, comprising:*

*a housing configured to accommodate first and second valves, and to receive fluid flow from said inlet conduit;*

*a first valve mounted in said housing having a seatable valve disc having an edge, moveable between a closed configuration preventing flow and an open configuration permitting flow through a first inlet port in a first direction, said first valve mounted to extend along an axis defined by said first direction;*

*a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;*

*said fluid flow having an average streamline path between said inlet and said outlet conduit, wherein the sum of changes in flow direction of said average streamline path is not substantially greater than about 180 degrees,*

*further comprising at least a first shut-off valve for shutting off flow into said first valve, wherein said first valve is positioned vertically above said first shut-off valve.*

*21. An apparatus, as claimed in claim 20, further comprising a second shut-off valve for shutting off flow from said second valve, wherein said second valve is positioned vertically above said second shut-off valve.*

*22. An apparatus, as claimed in claim 21, further comprising a first handle for operating said first shut-off valve, said first handle extending horizontally in a direction perpendicular to a line connecting said inlet and outlet conduits.*

*23. An apparatus, as claimed in claim 22, further comprising a second handle for operating said second shut-off valve, said second handle extending horizontally in a direction perpendicular to a line connecting said inlet and outlet conduits.*

*24. An apparatus, as claimed in claim 21, further comprising a first handle for operating said first shut-off valve wherein, when said first shut-off valve is opened and closed,*

*said first handle moves linearly in a direction perpendicular to a line connecting said inlet and outlet conduits.*

25. *An apparatus, as claimed in claim 24, further comprising a second handle for operating said second shut-off valve wherein, when said second shut-off valve is opened and closed, said second handle moves linearly in a direction perpendicular to a line connecting said inlet and outlet conduits.*

\* \* \* \* \*

US005107888C2

(12) EX PARTE REEXAMINATION CERTIFICATE (5255th)
United States Patent
Dunmire

(10) Number: US 5,107,888 C2
(45) Certificate Issued: Jan. 10, 2006

(54) N-SHAPED BACKFLOW PREVENTOR

(75) Inventor: Charles W. Dunmire, Fresno, CA (US)

(73) Assignee: The Chase Manhattan Bank, Houston, TX (US)

Reexamination Request:
No. 90/006,613, Apr. 28, 2003

Reexamination Certificate for:
Patent No.: 5,107,888
Issued: Apr. 28, 1992
Appl. No.: 07/650,799
Filed: Feb. 5, 1991

Reexamination Certificate B1 5,107,888 issued Jun. 3, 2003

Related U.S. Application Data

(63) Continuation-in-part of application No. 07/435,870, filed on Nov. 13, 1989, now Pat. No. 4,989,635.

(51) Int. Cl.
F16K 15/03 (2006.01)

(52) U.S. Cl. .................. 137/527; 137/512; 137/614.2; 251/337

(56) References Cited

U.S. PATENT DOCUMENTS 2,586,942 A * 2/1952 Grove .................. 137/115.26
4,080,980 A    3/1978 Hunter
4,276,897 A * 7/1981 Griswold ............... 137/218
4,357,954 A   11/1982 Hunter
4,878,515 A * 11/1989 Stevens ................. 137/218
4,991,622 A * 2/1991 Brewer et al. ........... 137/512

FOREIGN PATENT DOCUMENTS

DE    24 50 465 A1    4/1975

OTHER PUBLICATIONS

Febco Publication, 1982, 22 and final page.
Manual of Cross–Connection Control, 1985, 132–133, 141.

* cited by examiner

Primary Examiner—Stephen M. Hepperle

(57) ABSTRACT

A backflow preventor with increased performance, and increased ease of installation is provided. The check valves are configured to assist in redirecting flow along the desired pathway, when they are in the open position. The pathway is designed so that the number of changes of flow direction of the average streamline flow is reduced, preferably being about 180°. The check valves are configured to reduce or eliminate divergent flow around the edges of the valve disks. A check valve with a reduced hold-open pressure includes a biasing device, such as a spring, directly connected to a pivoting clapper at one end and to the valve body at the other end. No intervening pivoting links are used between the spring and the clapper. Preferably, the clapper is connected only by being pivoted to the valve body and by the spring connecting it to the valve body.

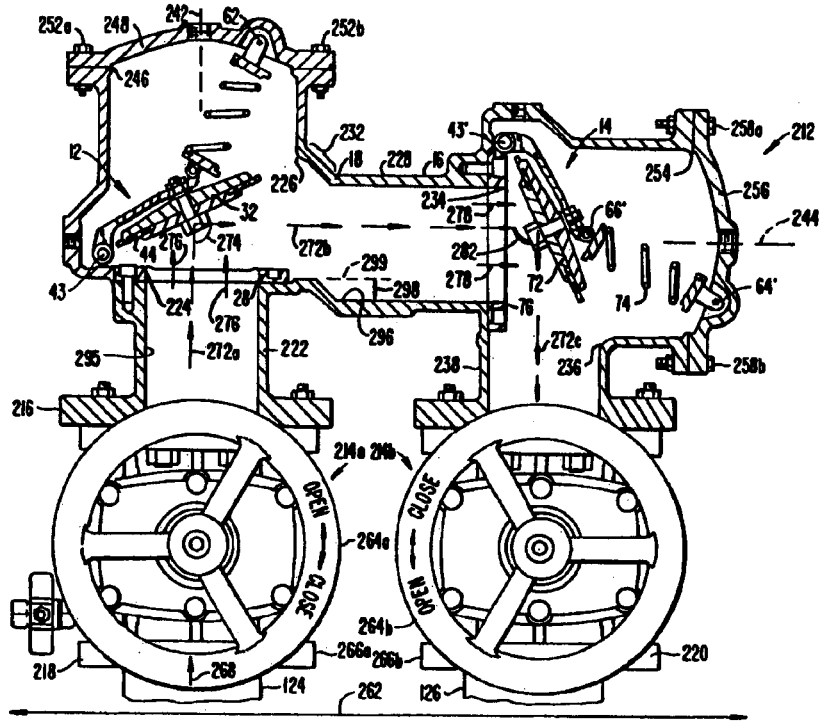

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–14 were previously cancelled.

Claim 18 is cancelled.

Claims 15, 19 and 20 are determined to be patentable as amended.

Claims 16–17 and 21–25, dependent on an amended claim, are determined to be patentable.

New claim 26 is added and determined to be patentable.

15. A backflow preventor apparatus for connection to parallel, oppositely-flowing inlet and outlet conduits, comprising:
 a housing configured to accommodate first and second valves, and to receive fluid flow from said inlet conduit;
 a first valve mounted in said housing having a seatable valve disc having an edge, moveable between a closed configuration preventing flow and an open configuration permitting flow through a first inlet port in a first direction, said first valve mounted to extend along an axis defined by said first direction;
 a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;
 said fluid flow having an average streamline path between said inlet and said outlet conduit, wherein the sum of changes in flow direction of said average streamline path is not substantially greater than about 180 degrees,
 further comprising a first flange for coupling to said inlet conduit and a second flange for coupling to said outlet conduit wherein said first and second flanges are substantially horizontal *and a connecting conduit coupling said first and second valves, wherein at least a portion of said connecting conduit is downward sloping.*

19. [An apparatus, as claimed in claim 18] *A backflow preventor apparatus for connection to parallel, oppositely-flowing inlet and outlet conduits, comprising:*
 *a housing configured to accommodate first and second valves, and to receive fluid flow from said inlet conduit;*
 *a first valve mounted in said housing having a seatable valve disc having an edge, moveable between a closed configuration preventing flow and an open configuration permitting flow through a first inlet port in a first direction, said first valve mounted to extend along an axis defined by said first direction;*
 *a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;*
 *said fluid flow having an average streamline path between said inlet and said outlet conduit, wherein the sum of changes in flow direction of said average streamline path is not substantially greater than about 180 degrees;*
 *further comprising a connecting conduit coupling said first and second valves, wherein at least a portion of said connecting conduit is downward sloping.*

20. A backflow preventor apparatus for connection to parallel, oppositely-flowing inlet and outlet conduits, comprising:
 a housing configured to accommodate first and second valves, and to receive fluid flow from said inlet conduit;
 a first valve mounted in said housing having a seatable valve disc having an edge, moveable between a closed configuration preventing flow and an open configuration permitting flow through a first inlet port in a first direction, said first valve mounted to extend along an axis defined by said first direction;
 a second valve mounted in said housing having a seatable valve disc having an edge, movable between a closed configuration preventing flow and an open configuration permitting flow through a second inlet port in a second direction, said second valve mounted to extend along an axis defined by said second direction, said axis of mounting of said second valve being substantially perpendicular to said axis of mounting of said first valve;
 said fluid flow having an average streamline path between said inlet and said outlet conduit, wherein the sum of changes in flow direction of said average streamline path is not substantially greater than about 180 degrees,
 further comprising at least a first shut-off valve for shutting off flow into said first valve, wherein said first valve is positioned vertically above said first shut-off valve, *and a connecting conduit coupling said first and second valves, wherein at least a portion of said connecting conduit is downward sloping.*

26. *An apparatus as claimed in claim 15, wherein said housing including a body housing at least one of said first and second valves and at least one of said first and second flanges is integral with said body.*

\* \* \* \* \*